Patented Dec. 19, 1950

2,534,249

UNITED STATES PATENT OFFICE 2,534,249

PROCESS OF MAKING CORNSTARCH

Elton R. Darling, Muncie, Ill., and William E. C. Yelland, Washington, D. C., assignors to Lauhoff Grain Company, Danville, Ill., a corporation of Illinois No Drawing. Application April 14, 1949, Serial No. 87,562

15 Claims. (Cl. 127—67)

The present invention relates to an improved process for the liberation of substantially unbroken and unaltered starch granules from corn (maize).

The separation of starch from corn is an old industry, but has almost invariably been applied to corn that has not been extensively milled. There are, however, available large amounts of intermediate and by-products of the dry-milling of corn. These by-products contain large quantities of starch which it would be very desirable to recover, if a process could be provided to do so in a simple and inexpensive manner, and which would provide corn starch of sufficiently high purity to meet commercial requirements.

It is one of the objects of the present invention to provide an improved method for the separation and recovery of relatively pure corn starch from by-products of the dry-milling of corn.

A further object is to provide a process in which not only starch is produced, but in which the proteinaceous constituents of the raw material are also separable to produce useful articles of commerce, such as oils and vegetable proteins.

It has already been proposed to liberate starch from its association with proteinaceous materials from wheat flour by treating such wheat flour with solutions of alkalies of a strength insufficient to gelatinize or otherwise alter the starch, but dissolving, or at least colloidally dispersing, the proteinaceous substances contained in the wheat flour. An example of such a process is the patent to R. J. Dimler No. 2,455,981, of December 14, 1948. In this Dimler process wheat flour is suspended in dilute solutions of alkali for a time sufficient to dissolve the proteins, whereafter the alkaline slurry is separated into liquid and solids by one of two alternative methods. In the first method the alkaline slurry is centrifuged in an imperforate basket type of centrifuge, whereby a cake of reasonably pure starch is obtained while the dissolved proteins remain as the liquid component. This cake is then again slurried up with water, and once again run through the same kind of a centrifuge, to obtain a cake of relatively pure wheat starch. The liquors containing the proteins may be acidified to liberate and precipitate the proteins therefrom, which may then be recovered by centrifuging, or otherwise. In the second method, the alkaline slurry is run over starch tables, where the starch separates out to a considerable extent in fairly pure form, but with not as great a yield, so that it becomes necessary to treat the table tailings by the centrifugal separation step of the first method. The alkaline liquors from the starch tables may be combined with the effluents of the centrifuge, acidified, and the proteins recovered.

Attempts to utilize a process of this general type with the by-products of the dry-milling of corn were found to be productive of very poor yields, undoubtedly because of the differences both in the starches as well as in the proteins. It would appear that the proteins of wheat flour are very much more readily dissolved or colloidally dispersed by dilute alkali, while in the case of corn the proteins do not so readily dissolve, and, moreover, the starch is more difficult to separate from a suspension or solution of the corn proteins in alkali.

Therefore, in accordance with the present invention, it was found necessary to increase the non-solubles content of the by-product of the dry-milling of corn by the addition of some substances which would resist the dissolving effect of the alkali, and also would serve to entangle the starch granules so that they could be more readily filtered or screened from the alkaline solution or dispersion of the corn proteins. Bran was found to be the ideal material for the purpose, not only because of its nature, but also because it is readily available in a mill where corn is being processed by dry-milling methods.

While there is bran already present in such by-products, it was found advisable to add an excess of bran over that normally contained in these by-products, and to subject a mixture of such bran and by-products to alkaline treatment as hereinafter more fully set forth.

In the present process, one of the main novel features involves the utilization of such an excess of bran, employed in suspension in an alkaline solution to effect the liberation of the starch granules from the therewith associated proteinaceous material, whereby it becomes possible to effect proper separation between the resulting mixture of residual bran substances and suspended starch on the one hand and the alkaline solution and its dissolved and suspended proteinaceous material on the other hand; whereafter the resulting mixture of bran-like residual matter and starch may be slurried up in water and the bran-like material screened out, while the starch passes through the screens and may be recovered in substantially pure form.

The process is most effectively carried out with degerminated corn which has first been freed from its associated bran. Such degerminated and bran-freed corn is first adjusted as to its moisture content to about within the range of from about 18% to about 22%. If the corn is deficient in moisture, this degree of moisture content may be attained by humidifying the corn by the expedient of spraying it with water and allowing it to stand about twelve to twenty-four hours until its moisture content is within the stated range. It is then run through a suitable mill, for example a hammer mill, to reduce it to particles smaller than a 4-mesh screen, although it may be comminuted so as to pass through an 8-mesh screen.

Instead of using such specially ground degerminated corn, and to add the desired amount of bran thereto, it is preferred to employ a so-called "hominy feed" by-product that has about the following screen analysis, and which already contains the desired amount of excess bran (as compared with the natural bran content of degerminated corn):

| | Percent |
|---|---|
| All through 8 mesh. | |
| On 10 mesh | 0.3– 1.5 |
| On 12 mesh | 0.5– 3.0 |
| On 14 mesh | 1.4– 4.7 |
| On 16 mesh | 3.8– 7.5 |
| On 20 mesh | 10.0–11.9 |
| On 24 mesh | 5.7– 7.0 |
| On 28 mesh | 10.5–12.6 |
| On 32 mesh | 7.7– 9.2 |
| On 35 mesh | 6.2– 9.4 |
| On 42 mesh | 4.1– 6.2 |
| On 48 mesh | 1.6– 5.3 |
| On 60 mesh | 2.3– 3.7 |
| On 65 mesh | 2.3– 4.9 |
| On 80 mesh | 1.3– 3.4 |
| On 100 mesh | 3.8– 4.7 |
| Through 100 mesh | 20.4–25.7 |

The proximate analysis of this material was about as follows:

| | Percent |
|---|---|
| Moisture | 14.2 |

Other ingredients, calculated to bone-dry basis:

| | Percent |
|---|---|
| Protein | 10.55 |
| Fat | 6.78 |
| Fiber | 5.26 |
| Ash | 2.145 |

The remaining ingredient, mainly the starch, was about 60%–70% on the dry basis.

It may be desirable, before subjecting this material to the further steps hereinafter disclosed, to subject it to a suitable de-fatting operation, which might consist of solvent extraction, or, preferably, is by a special method disclosed and claimed in a co-pending application of the present inventors, Serial No. 92,521 filed May 10, 1949.

Irrespective, however, of whether this be done or not, the material, if it does not already contain enough bran, is mixed with bran, preferably corn bran, in an amount to supply it with about twice its normal bran content. A considerably larger amount of bran is advantageous, and it may be as great as an equal weight of bran as that of the material being treated.

*Use of alkali hydroxides.*—This mixture is then suspended in an alkaline solution, the alkalinity of which is gradually brought up to a pH of about 11.5 to 12 during a prolonged agitation of the material in the alkaline solution. A two hour agitation, with the proportion of about 2 pounds of the mixed material to each U. S. gallon (231 cubic inches) is preferred, and these proportions are quite critical. While potassium hydroxide may be used, it is preferred to employ sodium hydroxide, a sufficient amount of which is fed into the agitated mixture during the process to bring, and then to maintain, the pH at about 11.5 to 12.0. This degree of alkalinity has been found to be quite critical. Also, it has been found necessary to start with a much lower pH, say about 8 to 8.5, and only incrementally to add the sodium hydroxide, or other alkali hydroxide, during the agitation. The agitation should be quite violent, and continued for about two hours. This also has been found to be quite critical. The agitation should be carried out at the normal room temperature, as for example within the range of from about 65° F. to about 90° F.; this being the normal range throughout the year in the Northern Hemisphere.

During the agitation with the solution of the alkali hydroxide certain proteinaceous substances in the corn, and some of the pentosans and hemicelluloses in the bran, will become suspended, and some of them dissolved, in the alkali solution, which is, however, not strong enough to remove the outer layer of the corn starch granules, which latter therefore remain intact. As a result, there will be formed a suspension containing free starch granules, suspended proteinaceous material, dissolved alkali, and some dissolved hemicelluloses, pentosans and proteinaceous substances.

This suspension is of such a nature that it readily lends itself to centrifugal separation into a lighter and a heavier component, so that separate streams can be recovered from a suitably constructed and operated centrifuge. It is preferred to employ a centrifuge of the so-called "Sharples" type having a horizontally disposed cone revolving at about 3,200 revolutions per minute. When the above-mentioned suspension is fed into such a centrifuge, two products will be produced. The one, issuing from one outlet of the centrifuge, will contain the alkaline solution and the dissolved and suspended proteinaceous material, while the other will comprise a wet caked mass of the liberated starch granules and what is left of the bran.

The liquor containing the dissolved and suspended proteinaceous material may be discarded, or its values extracted by any suitable means, which form no part of the present invention.

The suspension of starch granules and the residue of the bran is slurried up with water, using about two parts of water to one of the caked mass, and the resulting suspension or slurry is then filtered on an inclined vibratory screen, so that the bran, which will remain on the screen, will eventually be discharged from the end thereof, while the starch granules, now free of bran and proteins, will pass through the screen. The starch milk thus obtained is then treated to recover the starch in any of the well-known ways, and may then be dried or worked up into any desired products. The Sharples "Super-D-Canter" may be used for this purpose.

The bran residue discharged from the top of the inclined vibratory screen still contains some proteins. It may be washed free from alkali, or neutralized, say with hydrochloric acid to yield harmless sodium cloride, and then incorporated in animal feeds or the like.

While sodium hydroxide has been described in the above example, it has been found that other alkaline-reacting materials, capable of producing an alkalinity within the ranges hereinabove mentioned, may be used with substantially equivalent results. Examples of the use of such other forms of alkaline materials are as follows:

*Use of sodium carbonate.*—To 93 U. S. gallons (of 231 cubic inches each) of water, contained in a 220-gallon conical-bottom steel tank, were added 231 pounds of the dry-milling by-product as above described, followed by the addition of 30 pounds of a technical grade of sodium carbonate. The resulting slurry was thoroughly agitated by means of an efficient propeller-type of mixer for two hours. At the end of this period the thus produced steep slurry was fed at the rate of 8 to 9 gallons per minute to a Sharples Super-D-Canter type of centrifuge where a continuous separation of most of the steep solids from the steep liquor took place. The amount of steep effluent (containing most of the proteins, etc.), was about 74 gallons. The steep solids were re-slurried to a total volume of 98 gallons with fresh water. The resulting secondary slurry was then screened twice to effect a separation of the bran from the starch. A 1.5 foot by 5 foot "Selectro" vibrating screen, provided with a 200 mesh screen-cloth, was used to do this. The volume of starch slurry collected was 300 gallons. The screening residue was again re-slurried with water and de-watered at the rate of about 13–14 gallons per minute on the Super-D-Canter. 210 pounds of residue at 60.2% moisture and 69 gallons of effluent were collected. The starch slurry was de-watered in the same way. 179 pounds of starch at 53.0% moisture were obtained by this modification of the process. It will thus be seen that sodium carbonate can successfully be employed in the practice of this process.

*Use of trisodium phosphate.*—In this modification of the process, trisodium phosphate was substituted for the sodium carbonate, the procedural steps being the same as in the case of the use of the sodium carbonate. The proportions employed were about 200 pounds of the by-product, 93 gallons of water, and 12 pounds of trisodium phosphate. The yields were about the same, within experimental error, so that it can be stated that trisodium phosphate may be used in place of either sodium hydroxide (the main example), or of sodium carbonate.

*Use of monoethanolamine.*—It was found that monoethanolamine could also serve to produce the required amount of alkalinity. Using the same procedural steps as already given, particularly in connection with the use of sodium carbonate, to 93 gallons of water there were added 231 pounds of the by-product, and there were then added 8 liters of technical grade of monoethanolamine, and the resulting slurry agitated for two hours. The rest of the process was the same as already fully described. The yield of starch was approximately the same as in the other examples given. Thus it was demonstrated that monoethanolamine could be used as the alkaline material in this process.

*Use of other alkaline-reacting materials.*—A sufficient number of laboratory tests have also been made to show that other alkaline-reacting materials, including even the hydroxides of the alkaline earths, may be employed for this process. Thus, to show the use of calcium hydroxide, 84 parts by weight of the by-product were treated with 700 parts of 0.05 normal calcium hydroxide solution, the mixture being stirred for two hours. The initial pH of the mixture was 10.5, but it gradually dropped (due to the action of the alkaline earth upon the proteins) to 9.0.

The separatory procedures, while carried out on a laboratory scale, substantially followed the procedures already outlined, involving separation of the starch-bran fraction from the solution or dispersion of the proteins, and the subsequent separation of the starch from the bran. Further tests involved the utilization of tetrasodium pyrophosphate, and mixtures of sodium hydroxide with salt, and mixtures of sodium hydroxide and sodium sulfite.

On a large scale production basis, however, the use of sodium hydroxide or sodium carbonate is to be preferred, mainly on account of the cost. Also, the incremental addition of the alkaline material, so as to maintain the desired alkalinity, as measured by the pH of the suspensions, is decidedly advantageous.

The essential feature of the present invention is the treatment of some form of the comminuted corn with an alkaline solution in the presence of an excess of bran. The other important feature is the gradual addition of alkali during the stirring of the mixture of corn particles and bran, so as gradually to bring the pH up to the level of 11.5 to 12, and the maintenance of this level by the addition of more alkali as needed during the operation. The exact function of the bran is not perfectly understood, but it may be ventured to surmise that some of the alkali-protein complexes formed by the alkali may be adsorbed on the bran surfaces.

While the deliberate addition of bran has been disclosed, it will be obvious to those familiar with this art that a corn by-product already containing a greater bran content that that of corn may be employed. In many dry-milling operations, such a concentration of bran in the by-products is effected, and it is therefore to be understood that the use of such a material is to be construed as being within the intended scope of the present invention.

The apparatus required for the carrying out of this process is all standard equipment, and hence requires no further description or illustration.

Applicants claim:

1. Process of liberating starch from a comminuted degerminated by-product from the dry-milling of corn which comprises treating such a product in admixture with an amount of bran exceeding the normal bran content of said corn with a dilute solution of an alkaline-reacting material to produce a slurry having an initial hydrogen-ion concentration of about pH 8.0 and gradually increased to about 11.5 to 12.0, agitating said slurry at about normal room temperature for a period of at least several hours, and then physically separating the undissolved solids from said slurry, re-slurrying them in water, and screening said secondary slurry to separate bran from the starch granules, and recovering the latter.

2. In the process of liberating whole starch granules from corn, the steps which comprise treating comminuted degerminated corn in admixture with an amount of added bran at least equal to that normally contained in the corn with a dilute alkaline-reacting solution having an initial hydrogen-ion concentration of about pH 8.0 gradually increased to about 11.5 to 12.0 to effect a selective dispersion of the proteinaceous and fatty constituents of said corn, leaving the starch and bran content of the mixture substantially undissolved, physically separating the undissolved material, and subsequently separating the starch granules from the bran particles.

3. Process of liberating starch granules from a comminuted degerminated corn product which comprises suspending such a product in water together with an amount of corn bran greater than the normal bran content of such product, gradually adding an alkaline-reacting material to the suspension to bring it from an initial alkalinity of from about pH 8.0 to one of about pH 12.0, agitating the suspension for a period of about two hours at normal room temperatures to effect a solution of the proteinaceous and fatty constituents of the said corn product, leaving the starch and bran in undissolved form; centrifugally separating the suspension into solids and liquid; slurrying the solids with water to form a secondary suspension, and screening the latter into starch granules that pass through the screen and into bran particles that remain on the screen; and collecting said thus separated starch granules.

4. In the separation of the proteinaceous and starchy constituents of degerminated corn by means of alkaline dispersion-solution of the protein having a hydrogen ion concentration increasing from an initial pH of about 8.0 to one of about 11.5 to 12.0 without substantially swelling or altering the starch granules in said corn, the step of effecting said dispersion-solution in admixture with a greater amount of bran than is normally present in said corn.

5. Process of liberating starch from corn which comprises the step of agitating comminuted degerminated corn in a solution of an alkali hydroxide having a hydrogen ion concentration of from about pH 8.0 to about 11.5 to 12.0 in the presence of an amount of bran in excess of that normally present in said corn.

6. Process of liberating starch from corn which comprises the step of agitating comminuted degerminated corn in a solution of an alkali hydroxide having a hydrogen ion concentration of from about pH 8.0 to about 11.5 to 12.0 in the presence of about twice its weight of bran.

7. Process of recovering starch from corn which comprises humidifying raw degerminated corn to a moisture content of from about 18% to 22%, grinding the humidified corn, screening it through a not smaller than 8-mesh sieve; adding to the screened material an excess of bran greater than the normal bran content of the corn, subjecting the resulting mixture to the action of an alkaline-reacting solution having a hydrogen-ion concentration initially of about pH 8.0 and gradually brought up to about 11.5 to 12.0 and agitating it therein for about two hours to release proteinaceous substances from the material; centrifuging the resulting suspension to effect a separation between released proteins on the one hand and suspended liberated starch granules and residual bran substance on the other; slurrying the mixture of residual bran substance and starch in water, screening off the bran, and recovering the starch.

8. The process as defined in claim 7, in which the alkaline-reacting solution is that of sodium hydroxide.

9. The process as defined in claim 7, in which the alkalinity of the alkali solution is gradually brought up from a hydrogen ion concentration of about pH 8.0 to a pH of from 11.5 to 12.0 by the incremental addition of an alkaline-reacting material during the agitation of the mixture.

10. The process as defined in claim 7 in which the amount of bran added is not less than about twice the weight of the corn product treated.

11. The process as defined in claim 7 in which the alkaline-reacting solution is that of sodium carbonate.

12. The process as defined in claim 7 in which the alkaline-reacting solution is that of tri-sodium phosphate.

13. The process as defined in claim 7 in which the alkaline-reacting solution is that of monoethanolamine.

14. The process as defined in claim 7 in which the alkaline-reacting solution is that of calcium hydroxide.

15. The process as defined in claim 7 in which the alkaline-reacting solution is that of tetrasodium pyrophosphate.

ELTON R. DARLING.
WILLIAM E. C. YELLAND.

REFERENCES CITED

The following references are of record in the file of this patent:

UNITED STATES PATENTS

| Number | Name | Date |
|---|---|---|
| 1,681,118 | Jaschke | Aug. 14, 1928 |
| 1,794,105 | David et al. | Feb. 24, 1931 |
| 2,284,239 | Wagner | May 26, 1942 |
| 2,455,981 | Dimler | Dec. 14, 1948 |

FOREIGN PATENTS

| Number | Country | Date |
|---|---|---|
| 102,465 | Germany | Apr. 5, 1899 |